United States Patent
Hoft et al.

[15] 3,694,730
[45] Sept. 26, 1972

[54] THYRISTOR C. C. SWITCH

[72] Inventors: Richard G. Hoft, Columbia, Mo.;
Tsuneo Kume, Kanda-machi, Japan

[73] Assignee: Emerson Electric Co., St. Louis County, Mo.

[22] Filed: May 3, 1971

[21] Appl. No.: 139,393

[52] U.S. Cl. .................................. 321/21, 321/45 C
[51] Int. Cl. ............................................. H02m 7/48
[58] Field of Search .............. 321/21, 19, 45 R, 45 C

[56] References Cited

UNITED STATES PATENTS

| | | | |
|---|---|---|---|
| 3,366,867 | 1/1968 | Dodge | 321/45 R |
| 3,538,419 | 11/1970 | Seki et al. | 321/45 C |
| 3,403,318 | 9/1968 | Krauthamer et al. | 321/21 X |
| 3,413,539 | 11/1968 | Lopitzsch | 321/45 R |
| 3,601,682 | 8/1971 | Iwata et al. | 321/45 R |

Primary Examiner—William M. Shoop, Jr.
Attorney—Polster and Polster

[57] ABSTRACT

An inverter commutation circuit has a thyristor (SCR) line switch interposed in one side of a D.C. line. Opening the line switch provides commutation for the inverter. The line switch is opened by discharging a capacitor through a diode connected in parallel with the switch. Load current is transferred to a diode coasting path while the line switch is open. The line switch is closed and the capacitor is charged to commutation voltage before the switch is reopened. Frequency control is provided by the cyclic repetition of the line switch and corresponding inverter operation. The line switch may be applied in a variety of inverter systems. The circuit provides means for a method of static inverter commutation by interruption of the supply line.

12 Claims, 6 Drawing Figures

Inventors
RICHARD G. HOFT
TSUNEO KUME
By
Attorneys 3,694,730

Inventors
RICHARD G. HOFT
TSUNEO KUME

By
Attorneys 3,694,730

THYRISTOR C. C. SWITCH

BACKGROUND OF THE INVENTION

This invention relates to commutation circuits for static inverters. The term inverter is used herein as a generic term embracing choppers, inverters, converters, and cycloconverters. The invention will be described with particular emphasis on motor speed control, but those skilled in the art will recognize its wide applicability to other applications.

The commercial availability of the silicon controlled rectifier (thyristor) has stimulated interest in the field of electronic motor controls. The squirrel cage induction motor is considered to be a low cost, reliable, electric machine. By utilizing these machines with inverters, or rectifier-inverter combinations, distinct advantages are obtainable. Induction motors can be used even where D.C. power is the only available source voltage. Where rectifier-inverter circuits are used, maximum motor speed is not limited by the A.C. power line frequency. Continuously variable speed control can be obtained without significantly increasing motor losses at reduced speeds. Full torque can be obtained over the entire motor speed range.

The principal problem in the design of thyristor (SCR) inverters is the incorporation of circuits which reliably turn off, or commutate the inverter thyristors at the correct times. Circuit elements which commutate the inverter thyristors must not appreciably increase inverter cost, size or weight; nor may they produce large additional power loss if high efficiency, inherent with most semiconductor power controls, is an objective.

Numerous circuit designs have been advanced in an effort to provide effective commutation for static converters. One of the more widely used circuits is described in the U.S. patent to McMurray, U.S. Pat. No. 3,207,974. Other inverter circuits and details thereof are described in B. D. Bedford and R. G. Hoft, *Principles of Inverter Circuits* (John Wiley & Sons, Inc., 1964). While these circuits work well for their intended purposes, their use in certain applications, for example, multiple phase inverters, requires a multiplicity of commutating components for the inverter required by each phase. The circuit of this invention eliminates repetitive components by interrupting the D.C. line and applying that line interruption to commutate all thyristors conducting in any inverter electrically connected to that D.C. line.

While a preferred embodiment and variations thereof are described in detail hereinafter, further background information concerning the development of the circuit of this invention is available at the Engineering Library, University of Missouri, Columbia Campus, in a doctoral thesis entitled *Thyristor D.C. Switch Inverter*, June, 1970, maintained on file by the University.

One of the objects of this invention is to provide a low cost, commutating circuit for a static inverter.

Another object of this invention is to provide a simple and reliable D.C. switch.

Other objects will become apparent to those skilled in the art in the light of the following description and accompanying drawings.

SUMMARY OF THE INVENTION

In accordance with this invention, generally stated, a main line D.C. switch electrically connected between a D.C. power source and a static inverter provides commutation for the inverter by interrupting current flow in the line. The D.C. switch is turned off, thereby opening the line, by discharging a capacitor through a diode connected across a silicon controlled rectifier used as the line switch. Circuit means, which in the preferred embodiment includes three additional silicon controlled rectifiers and three reactors, are electrically connected to the capacitor and provide for capacitor recharge before the inverter again requires commutation to produce the succeeding half cycle A.C. output. The preferred circuit embodiment provides a capacitor voltage which is independent of load current.

BRIEF DESCRIPTION OF THE DRAWINGS

In the drawings,

FIG. 3 is a diagrammatic representation of a second variation in the D.C. switch circuit of FIG. 1;

DESCRIPTION OF THE PREFERRED EMBODIMENT

Figure 1:
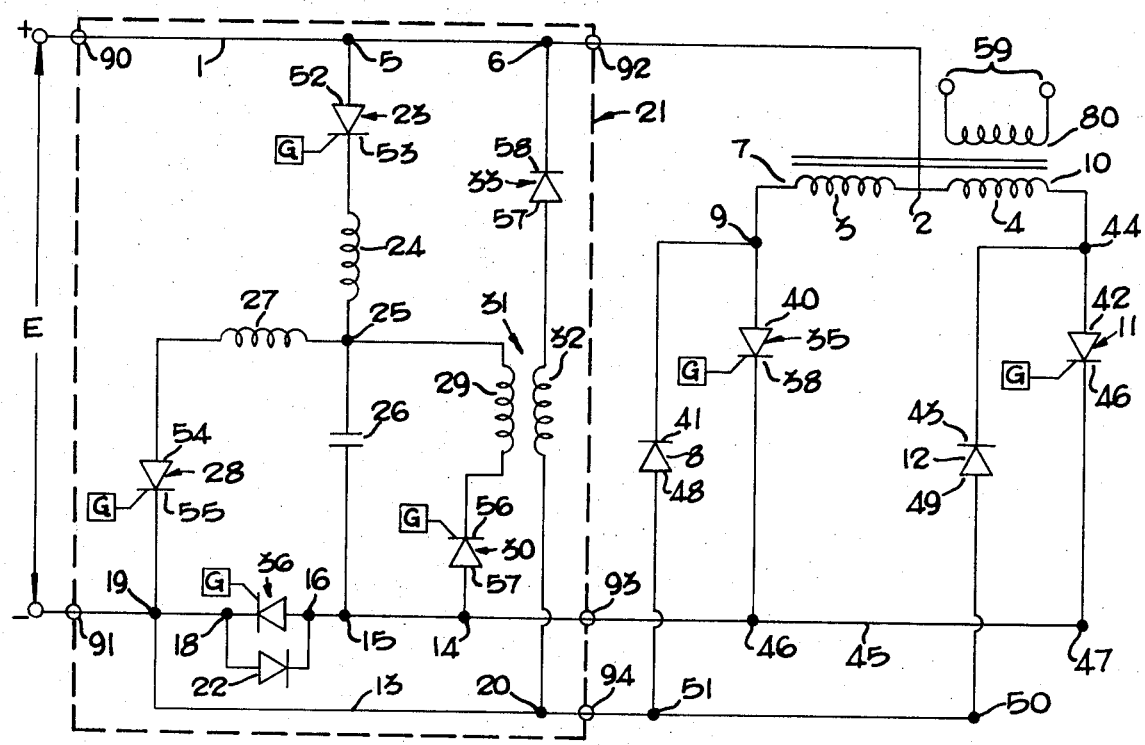
FIG. 1 is a diagrammatic representation of static D.C. switch of this invention applied to an inverter run, single phase induction motor.

Referring now to FIG. 1, reference numeral 1 indicates an electrical conductor electrically connected to a positive side of a D.C. source voltage, represented by the letter E, not shown. Typically, the D.C. source is either a generated D.C. supply or a D.C. supply obtained from a rectified A.C. source. Conductor 1 connects the source voltage through connection nodes 5 and 6 to a center tap 2 between winding parts 3 and 4. In the preferred embodiment, winding parts 3 and 4 are the main winding of an A.C. induction motor. However, other loads are compatible with the commutation method and circuit embodiment of this invention. In the diagrammatic representations of the drawings, the A.C. induction motor is represented by a center tap transformer having a secondary winding connected to a load not shown.

A coil end 7 of winding part 3 is electrically connected to an anode side 40 of a silicon controlled rectifier (SCR) 35 and to a cathode side 41 of a diode 8 at a connection node 9.

A coil end 10 of winding part 4 is electrically connected to an anode side 42 of a silicon controlled rectifier (SCR) 11 and to a cathode side 43 of a diode 12 at a connection node 44.

Anode sides 38 and 46 of silicon controlled rectifiers 35 and 11 are electrically connected to a conductor 45 at nodes 46 and 47 respectively. The arrangement of silicon controlled rectifiers 11 and 35 with the center tap winding is a conventional inverter technique and the circuit operation is discussed in detail hereinafter.

Conductor 45 is electrically connected to the negative side of the source voltage through connection nodes 14, 15, 16, a silicon controlled rectifier (SCR) 36, and nodes 18 and 19.

A conductor 13 is electrically connected between node 19, through a node 20, to an anode side 49 of diode 12 at a node 50. Anode side 48 of diode 8 is electrically connected to conductor 13 at a node 51.

A D.C. switch circuit 21, enclosed by phantom lines in FIG. 1, has silicon controlled rectifier 36 as its main switching component. A diode 22 is connected in parallel with SCR 36. The remaining components of switch 21 are primarily concerned with commutation of SCR 36. Switch 21 has two input terminals 90 and 91 electrically connected to the positive and negative sides respectively of the D.C. source voltage and three output terminals 92, 93 and 94. Terminals 92 and 93 are connected to the D.C. line supply and connect that supply to the load-inverter circuit while terminal 94 provides a coasting or discharge path for inductive current as discussed hereinafter. Terminals 90, 91, 92, 93 and 94 provide a convenient means for discussing the segregated switch circuit of this invention and need not appear as conventional connection points or terminal jacks in commercial embodiments using the switch circuit of this invention.

A silicon controlled rectifier (SCR) 23 has an anode side 52 electrically connected to node 5 in line 1 and a cathode side 53 electrically connected to a first side of an inductor 24. A second side of inductor 24 is connected to a node 25. A commutating capacitor 26 is electrically connected between node 25 and node 15 in conductor 45.

An inductor 27 is electrically connected between node 25 and an anode side 54 of a silicon controlled rectifier (SCR) 28. A cathode side 55 of SCR 28 is connected to conductor 45 and conductor 13 at node 19.

An inductor 29 has a first side electrically connected to node 25 and a second side connected to a cathode 56 of a silicon controlled rectifier (SCR) 30. Anode 57 of SCR 30 is electrically connected to conductor 45 at node 14. Inductor 29 is the primary side of a transformer 31. A secondary winding 32 of transformer 31 is electrically connected between a node 20 in conductor 13 and an anode 57 of a diode 33. Diode 33 has a cathode 58 connected to conductor 1 at a node 6.

Conventional gate circuitry is provided for gate control of all silicon controlled rectifiers shown in FIGS. 1, 3, 4 and 5. In order to maintain circuit simplicity, the conventional gate circuits are represented by the box enclosed letter G. However, gate circuitry may be found in the above-cited thesis, *Thyristor D.C. Switch Inverter*; the *SCR Manual*, 4th Edition, General Electric Semiconductor Products Department, Syracuse, New York, 1967; and in F. G. Turnbull, "A Carrier Frequency Gating Circuit for Static Inverters, Converters, and Cycloconverters," IEEE Transactions on Magnetics, Vol. Mag-2, No. 1, March, 1966, pp. 14–17.

Operation of the inverter of FIG. 1 is conventional in that alternate conduction of SCR 35 and SCR 11 provides an A.C. output across a pair of output terminals 59. Where, as in FIG. 1, an induction motor is the load, a revolving flux is established by the alternate current flow in the winding parts which in turn drives the motor rotor and this load is represented by the current in winding 80 flowing through an equivalent motor load, not shown, electrically connected across terminals 59. It is conventional to use transformer coupling in other inverter circuits. To effectively provide an A.C. output, SCR 11 and SCR 35 must be commutated reliably and the technique embodied in switch 21 is an important difference between our invention and other types of inverter circuits. Current from the D.C. source flows along conductor 1 to center tap 2. Assuming SCR 35 and the line SCR 36 are gated "on," the current will return to the source via both SCRs and conductor 45.

To commutate SCR 35, SCR 36 itself must be opened, or commutated. Commutation of SCR 36 occurs by gating SCR 28 and removing gate command from SCR 36. The period between the times when SCR 28 is triggered and when SCR 36 is retriggered to reclose the circuit is referred to as the open or off-time. Technically, those skilled in the art recognize that neither SCR 36 or SCR 35 is open completely while commutation is proceeding.

Figure 2:
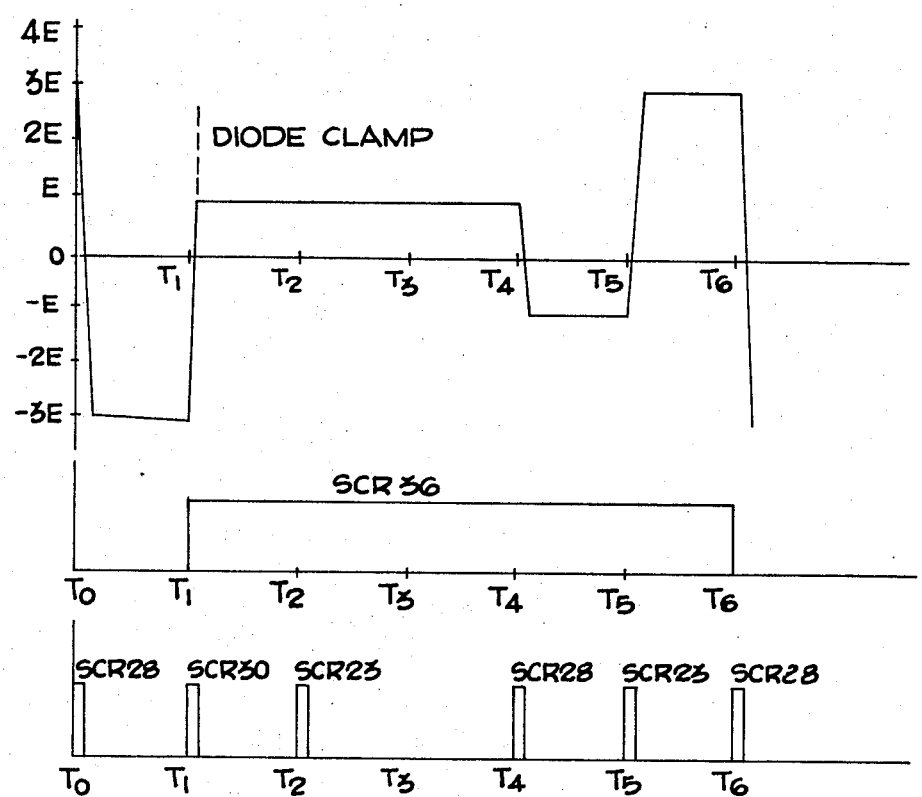
FIG. 2 is a graphic representation of the capacitor voltage and gate logic for the circuit components of the D.C. switch shown in FIG. 1, the times there represented being equivalent to a half cycle of the inverter A.C. output.

At SCR 28 turn-on, represented by $T_0$ in FIG. 2, capacitor 26 is assumed to be charged to three E volts positive on the node 25 side. The process of charging capacitor 26 is explained hereinafter. Conduction by SCR 28 establishes a resonant circuit in the loop path comprising SCR 28, diode 22, capacitor 26 and inductor 27 through which a half cycle of sinusoidal current flows when there is negligible D.C. load current. Conduction through diode 22 reverses the voltage across SCR 36. This forces commutation of SCR 36, opening that switch. When there is significant D.C. load current and in particular when the load is inductive, the SCR 36 and diode 22 branch opens prior to the end of the half cycle resonant current flow through capacitor 26, inductor 27 and SCR 28. Merely by way of example, assuming load current flow into node 15 at time $T_0$ in FIG. 2, there will occur, at some point after the peak in the resonant discharge through SCR 28, a current which equals the load current into node 15, and the SCR 36, diode 22 branch is removed, in electrical equivalence, from the circuit. Under these conditions, there is a period during which the load current is transferred from the path comprising SCR 35, conductor 45, capacitor 26, inductor 27, and SCR 28 to the coasting path comprising line 13, diode 12 and winding 4 back into the positive side of the power supply. As this current increases, the current flow through winding 3 and SCR 35 decreases below the holding current for SCR 35 and that switch opens. SCR 28 also opens as it is in series with SCR 35. At this point, capacitor 26 has reversed polarity. The main effect of the coasting described above is that capacitor 26 voltage may be different from negative three E volts during the period when it is shown as constant between $T_0$ and $T_1$ in FIG. 2.

At time $T_1$ in FIG. 2 both SCR 36 and inverter SCR 11 are triggered to reclose the D.C. line and supply power to the load. SCR 30 is triggered at the same time to begin the process of recharging commutating capacitor 26 to positive three E volts. Large reversals of capacitor voltages generally are not desirable because of increased circuit losses and a corresponding decrease in circuit efficiency. The particular circuit shown, that is, the branch connected between node 5 and node 15, which includes SCR 23, inductor 24 and capacitor 26, has electrical characteristics which make the voltage rise on capacitor 26 dependent on initial capacitor 26 voltage. The first step in recharging capacitor 26 is to reverse its voltage by current flow through SCR 30 and inductor 29. The voltage across winding 29, which is equal to the capacitor voltage so long as SCR 30 conducts, starts to reverse. A voltage proportional to the winding turns ratio is induced in secondary winding 32. Until the voltage induced in winding 32 reaches the source voltage E, diode 33 will not conduct and winding 32 is open. When the secondary voltage reaches E volts, diode 33 conducts and the voltage across the windings, and consequently capacitor 26 voltage, is clamped.

The presence of source voltage biased diode 33 in series with secondary winding 32 means that the secondary of transformer 31 equivalently is an open circuit until the voltage induced in winding 32 equals source voltage E. Consequently, the frequency of resonance of the loop path comprising SCR 30, inductor 29 and capacitor 26 is determined by the inductance of winding 29 and capacitor 26. SCR 30 is commutated as the resonant current through the inductor 29, capacitor 26 and SCR 30 loop path reverses. After this resonant discharge, capacitor 26 is positive on the node 25 side. Capacitor voltage may be varied by adjusting the turns ratio N, conventionally the ratio of main winding turns to secondary winding turns, of transformer 31. While a wide variety of turns ratios may be utilized with the circuit of our invention, the voltages shown in FIG. 2 result with a turns ratio equal to one.

The clamping action of inductor 32 and diode 33 is important. This circuit maintains voltage across the capacitor at the clamped level regardless of the load current magnitude.

SCR 23 is triggered at time $T_2$ in FIG. 2. This trigger merely checks to insure correct capacitor voltage polarity and magnitude. If the circuit has been operating for sufficient time to be in a normal operating condition, SCR 23 will not come on when triggered as the voltage across capacitor 26 will be equal to or greater than the source voltage E. If capacitor voltage is less than E at time $T_2$, SCR 23 will conduct causing a resonant charging of the capacitor through the loop path including SCR 23, inductor 24, capacitor 26, SCR 36 and the D.C. source. SCR 23 turns off at the end of the half cycle resonant current flow. Charging capacitor 26 by SCR 23 at this point in time is less desirable, again because of the magnitude of the reversal. However, the activation of SCR 23 at this time insures proper capacitor voltage polarity and magnitude, which may be particularly important during initial circuit operation.

SCR 28 is again fired at time $T_4$ to reverse capacitor 26 voltage. SCR 36 will not remain off at this time since gate command is provided for SCR 36 throughout the period $T_1$–$T_6$, as shown in FIG. 2. Capacitor 26 discharges, reversing polarity. SCR 28 turns off at the end of the half cycle resonant current flow in the capacitor 26, inductor 27, SCR 28, and the diode 22-SCR 36 branch path.

SCR 23 is then refired at time $T_5$. Since capacitor voltage is initially a negative E volts, the capacitor will again reverse polarity and charge to three E volts at the end of the resonant current flow through the path SCR 23, inductor 24, capacitor 26, SCR 36 and the D.C. source. At the end of the half cycle of resonance, SCR 23 commutates. After recharge, the capacitor is ready to commutate SCR 36. The cycle is repeated to regulate frequency and the switch of this invention may be used over a wide frequency range.

Merely by way of example, the following components work well in the circuit shown in FIG. 1 and described above utilizing a rectified and filtered supply voltage E of approximately 100 volts:

| Component | Rating |
|---|---|
| SCR 23 | Westinghouse 2N1849 |
| Diode 33 | G.E. A40D |
| Inductor 24 | 840 microHenries (air core solenoid) |
| Transformer 31 | Winding 29 is 200 microHenries |
| Inductor 27 | 85 microHenries (air core solenoid) |
| SCR 28 | Westinghouse 2N1849 |
| Capacitor 26 | 6 microFarads, 400 volts |
| SCR 30 | Westinghouse 2N1849 |
| SCR 36 | Westinghouse 2N1849 |
| Diode 22 | G.E. A40D |

FIG. 3 illustrates a variation in the switching circuit of FIG. 1. Component values are equivalent, with certain exceptions. Inductor 24 now forms the primary winding of a transformer 301 having a secondary winding 302. A first side of winding 302 is electrically connected to conductor 45 at a node 19' and a second side of winding 302 is connected to an anode 304 of a diode 303. A cathode 305 of diode 303 is electrically connected to conductor 1 at a node 306. Secondary winding 302 and diode 303 form a second voltage clamp on capacitor 26 and clamp that voltage to a value no greater than three E, with the proper turns ratio between windings of transformer 301, under the triggering sequence described above. The remainder of circuit operation remains the same.

Figure 4:
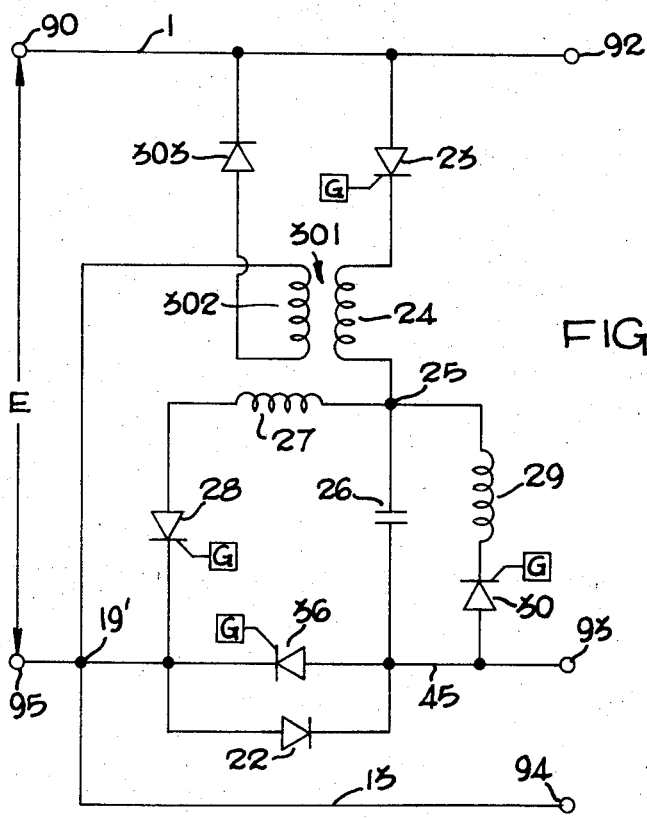
FIG. 4 is a diagrammatic representation of yet a third variation in the D.C. switch circuit of FIG. 1.

FIG. 4 illustrates a simplified version of the switch circuit shown in FIG. 1. The voltage clamp represented by secondary winding 32 of transformer 31 and diode 33 has been removed. Capacitor 26 charges to a higher value at time $T_1$ with the circuit of this embodiment.

Figure 5:
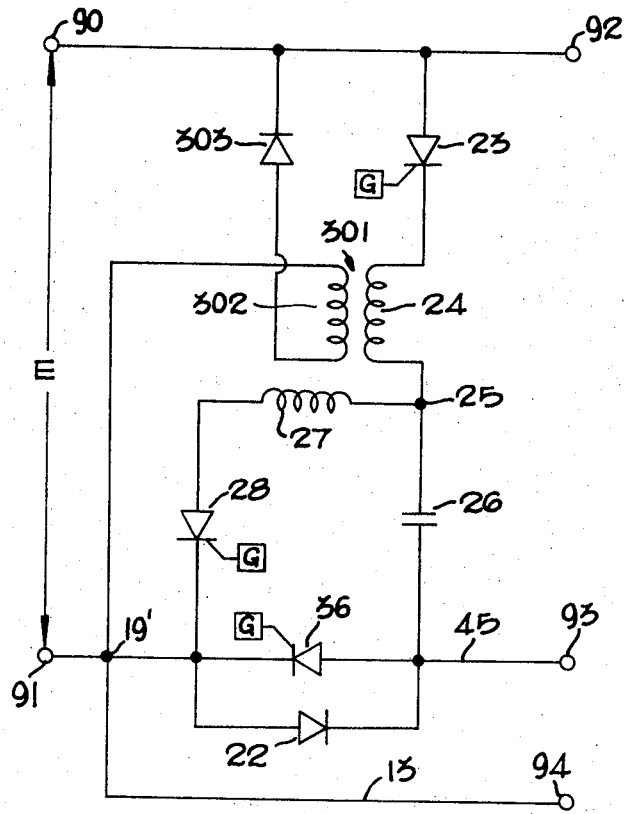
FIG. 5 is a diagrammatic representation of another embodiment of static D.C. switch of this invention.

FIG. 5 illustrates a further simplification of the circuit of FIGS. 1 and 4. The first voltage reversal of capacitor 26 occurs at time $T_2$ and the magnitude of the reversal is greater than the other embodiments of this invention. For this reason, the embodiments of both FIGS. 4 and 5 are less desirable than the embodiments of FIGS. 1 and 3.

All the embodiments of our invention provide two very advantageous features. The first is the ability to charge capacitor 26, or its equivalent in the various circuits illustrated, to a voltage considerably higher than the D.C. source voltage E, achieving in effect a "-doubler" type action. The second is that the voltage on capacitor 26 prior to commutation is a value that is independent of the nature of the load or magnitude of the load current.

Figure 6:
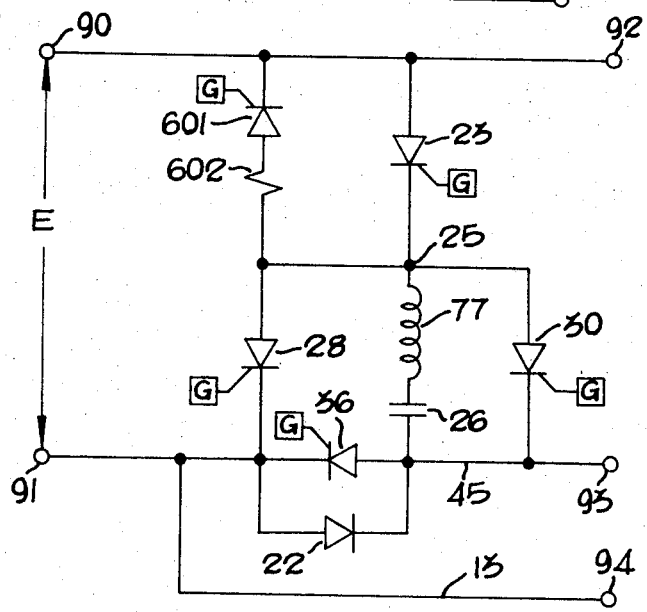
FIG. 6 is a diagrammatic representation of a fifth variation in the D.C. switch circuit of FIG. 1.

Numerous variations in the circuits of this invention will occur to those skilled in the art in view of the foregoing description and accompanying drawings. Thus, various component values may be substituted for those described. Various other circuit changes may be made. For example, the switching function may be accomplished by the circuit of FIG. 6. This circuit is not described in detail as in operation it produced excessive dissipation loss through a resistor 602 when an SCR 601 conducts. The circuit also requires a revised gate logic. These variations are merely illustrative.

Having thus described the invention, what is claimed and desired to be secured by Letters Patent is:

1. A D.C. switch circuit comprising:
   a first electrical conductor for electrically connecting said switch to a negative source of D.C. voltage;
   a first electrical switch of a silicon controlled rectifier type having an anode and a cathode corresponding to an input side and an output side connected in series with said first conductor;
   means for placing said first electrical switch in an on position for current flow in said first electrical conductor electrically connected to said first switch;
   means for placing said first electrical switch in an off position for preventing current flow in said first electrical conductor electrically connected to said first electrical switch, said means comprising a series circuit having a commutating capacitor, a first inductor, a second switch, and a diode electrically connected across said input and output sides of said silicon controlled rectifier switch whereby closing said second switch discharges said commutating capacitor across said diode, reversing the voltage across and commutating said silicon controlled rectifier;
   a coasting path electrical conductor electrically connected to said output side of said first electrical switch for connecting said output side to a static inverter circuit;
   a second electrical conductor electrically connected to a positive side of said D.C. source voltage;
   a circuit comprising a third electrical switch, a second inductor connected in series with said third switch, said third switch and second inductor being electrically connected between said second electrical connector and a connection node in said series circuit of said off positioning means intermediate said first inductor and said commutating capacitor, wherein closing said third switch recharges said commutating capacitor, said second inductor comprising a primary winding for a transformer having a secondary winding with a first side electrically connected to said first electrical conductor on the cathode side of said first electrical switch, and a diode electrically connected between a second side of said secondary winding and said second electrical conductor, said secondary winding and diode circuit comprising a first voltage clamp for said commutating capacitor.

2. The D.C. switch circuit of claim 1 wherein a fourth electrical switch is electrically connected from said anode side of said first switch through a third inductor to said connection node intermediate said first inductor and said commutating capacitor, wherein closing said fourth switch acts to recharge said commutating capacitor.

3. The D.C. switch circuit of claim 2 wherein aid third inductor comprises a primary winding for a second transformer having a secondary winding with a first side electrically connected to said first electrical conductor on the anode side of said first electrical switch, and a diode electrically connected between a second side of said secondary winding and said second electrical conductor, said secondary winding and diode circuit comprising a second voltage clamp for said commutating capacitor.

4. A D.C. line switch having two input terminals and three output terminals comprising:
   a first electrical conductor connected between the first input terminal and the first output terminal for electrically connecting a positive side of D.C. source voltage to said switch;
   a second electrical conductor connected between the second input terminal and the second output terminal for electrically connecting a negative side of said D.C. source voltage to said switch and said second input terminal;
   an electrical switch having input and output sides electrically interposed in series in said second electrical conductor;
   a third electrical conductor connected between a connection node on said output side of said electrical switch to the third output terminal;
   means for opening said line switch electrically connected to said line switch; and
   means for closing said line switch electrically connected to said line switch.

5. The D.C. line switch of claim 4 wherein said switch is a silicon controlled rectifier.

6. A D.C. line switch having two input terminals and three output terminals comprising:
   a first electrical conductor connected between the first input terminal and the first output terminal for electrically connecting the positive side of D.C. source voltage to said switch
   a second electrical conductor connected between the second input terminal and the second output terminal for electrically connecting a negative side of said D.C. source voltage to said switch and said second input terminal;
   an electrical switch having an input and output sides electrically interposed in series in said second electrical conductor;
   a third electrical conductor connected between a connection node on said output side of said electrical switch to the third input terminal;
   means for opening said line switch including a commutating capacitor electrically connected to said line switch;
   means for recharging said commutating capacitor;
   means for providing a first voltage clamp during recharging of said commutating capacitor; and
   means for closing said line switch electrically connected to said line switch.

7. The line switch of claim 6 further characterized by means for providing a second voltage clamp during recharging of said commutating capacitor.

8. A D.C. line switch for interrupting a source of D.C. voltage to a load comprising:
   an SCR having an anode and a cathode electrically connected to a first side of said D.C. voltage;
   a commutation circuit electrically connected to said SCR including a commutating capacitor, a first inductor, and a first electrical switch connected in series between said anode and said cathode of said SCR and a commutating diode of opposite polarity connected in parallel between said anode and said cathode of said SCR;

a coasting path conductor electrically connected from said cathode of said SCR to said load;

means for recharging said commutating capacitor comprising a second electrical switch and a second inductor in series with said last-mentioned switch electrically connected between a second side of said D.C. voltage and a connection node between said commutating capacitor and said first inductor; and at least one voltage clamp electrically connected to said means for recharging said commutating capacitor so as to restrict voltage changes of said capacitor during charging of said capacitor.

9. The D.C. line switch of claim 8 wherein said second inductor comprises a first transformer, a primary winding of said first transformer comprising a said second series inductor and a secondary winding of said first transformer being electrically connected from the cathode of said SCR to said second side of said D.C. voltage through a series diode, said secondary winding inductor and said series diode comprising said first voltage clamp during charging periods of said commutating capacitor.

10. The D.C. line switch of claim 9 further characterized by a third electrical switch and a third inductor, a first side of said third electrical switch being connected to the anode side of said SCR and a second side of said third switch being connected to a first side of said third inductor, the second side of said third inductor being connected to said connection node between said commutating capacitor and said first inductor.

11. The D.C. switch of claim 10 wherein said third inductor comprises a second transformer having a primary winding and a secondary winding, said primary winding of the last mentioned transformer being connected between said connection node and said third switch and said secondary winding of the last mentioned transformer being connected between said coasting path conductor and the anode of a diode, the cathode of said diode being connected to said second side of said D.C. voltage, said secondary winding and said diode forming a second voltage clamp during charging periods of said commutating capacitor.

12. The D.C. switch of claim 8 wherein said means for recharging said commutating capacitor further comprises a second SCR having an anode and a cathode and a transformer having a primary winding and a secondary winding, the anode of said second SCR being connected to the anode of said first SCR and the cathode of said second SCR being connected through said primary winding of said transformer to said connection node between said first inductor and said commutating capacitor, and a clamping diode having an anode and a cathode, the cathode of said clamping diode being connected to said second side of said D.C. voltage and the anode of said clamping diode being connected to a first side of said transformer secondary winding, a second side of said transformer secondary winding being connected to said coasting path conductor, said transformer secondary winding and said clamping diode comprising said voltage clamp for said commutating capacitor.

* * * * *

UNITED STATES PATENT OFFICE
CERTIFICATE OF CORRECTION

Patent No. 3,694,730    Dated September 26, 1972

Inventor(s) Richard G. Hoft and Tsuneo Kume

It is certified that error appears in the above-identified patent and that said Letters Patent are hereby corrected as shown below:

In the title, cancel "C. C." and insert ---D. C.---;

Column 7, line 66, after "wherein" cancel "aid" and insert ---said---;

Signed and sealed this 10th day of April 1973.

(SEAL)
Attest:

EDWARD M. FLETCHER, JR.          ROBERT GOTTSCHALK
Attesting Officer                Commissioner of Patents